(12) United States Patent
Shindo et al.

(10) Patent No.: US 11,565,154 B2
(45) Date of Patent: Jan. 31, 2023

(54) GOLF BALL

(71) Applicant: Sumitomo Rubber Industries, Ltd., Kobe (JP)

(72) Inventors: Ayaka Shindo, Kobe (JP); Takumi Kaneko, Kobe (JP); Hiroshi Tadaoka, Kobe (JP); Takahiro Shigemitsu, Kobe (JP); Kazuyoshi Shiga, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 20 days.

(21) Appl. No.: 16/993,056

(22) Filed: Aug. 13, 2020

(65) Prior Publication Data

US 2021/0086036 A1 Mar. 25, 2021

(30) Foreign Application Priority Data

Sep. 25, 2019 (JP) .............................. JP2019-174424

(51) Int. Cl.
*A63B 37/02* (2006.01)
*A63B 37/04* (2006.01)
*A63B 37/00* (2006.01)
*C08K 3/22* (2006.01)
*C08K 5/14* (2006.01)
*C08K 5/098* (2006.01)
*C08K 5/09* (2006.01)

(52) U.S. Cl.
CPC ...... *A63B 37/0051* (2013.01); *A63B 37/0063* (2013.01); *A63B 37/0065* (2013.01); *A63B 37/0074* (2013.01); *A63B 37/0096* (2013.01); *A63B 37/00621* (2020.08); *A63B 37/00622* (2020.08); *C08K 3/22* (2013.01); *C08K 5/098* (2013.01); *C08K 5/14* (2013.01); *C08K 5/09* (2013.01); *C08K 2003/2296* (2013.01); *C08K 2201/014* (2013.01)

(58) Field of Classification Search
None
See application file for complete search history.

(56) References Cited

U.S. PATENT DOCUMENTS

| | | | | |
|---|---|---|---|---|
| 4,056,269 | A * | 11/1977 | Pollitt | A63B 37/0003 473/372 |
| 4,838,556 | A * | 6/1989 | Sullivan | A63B 37/0003 473/372 |
| 5,697,856 | A * | 12/1997 | Moriyama | A63B 37/0003 473/374 |
| 6,194,505 | B1 * | 2/2001 | Sone | C08C 19/44 473/371 |
| 2017/0238545 | A1 * | 8/2017 | Zotkin | C07C 53/124 |
| 2017/0368419 | A1 * | 12/2017 | Nakajima | A63B 37/0063 |
| 2018/0002510 | A1 | 1/2018 | Comeau et al. | |
| 2018/0148549 | A1 | 5/2018 | Nakajima | |
| 2018/0178082 | A1 | 6/2018 | Hayashi et al. | |
| 2019/0330479 | A1 * | 10/2019 | Niimoto | B63B 35/52 |

FOREIGN PATENT DOCUMENTS

| | | | |
|---|---|---|---|
| JP | 59075932 | * | 4/1984 |
| JP | 2018-86179 A | | 6/2018 |
| JP | 2018-102693 A | | 7/2018 |

* cited by examiner

*Primary Examiner* — David J Buttner
(74) *Attorney, Agent, or Firm* — Birch, Stewart, Kolasch & Birch, LLP

(57) ABSTRACT

An object of the present invention is to provide a golf ball having a decreased spin rate on driver shots. The present invention provides a golf ball comprising a spherical core and at least one cover layer covering the spherical core, wherein the spherical core is formed from a rubber composition containing (a) a base rubber, (b) a compound represented by the formula (1) as a co-crosslinking agent, and (c) a crosslinking initiator, $$(R^1COO)M(OCOR^2)m \qquad (1)$$

in the formula (1), M represents a metal atom, m represents 1 or 2, $R^1$ and $R^2$ are different from each other, represent an alkenyl group having 2 to 30 carbon atoms or an alkynyl group having 2 to 30 carbon atoms and have a carbon-carbon double bond or a carbon-carbon triple bond at an α-position carbon atom bonding to the carbonyl group, and when m is 2, two of $R^2$ may be identical to or different from each other.

20 Claims, 1 Drawing Sheet

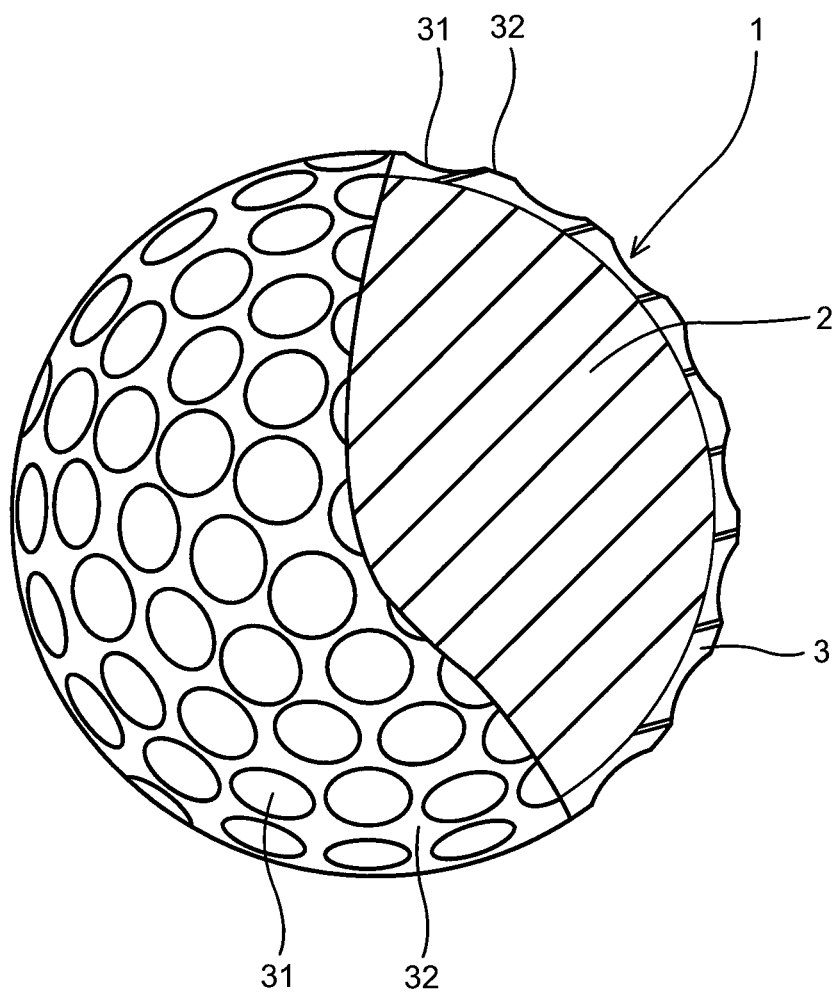

GOLF BALL

FIELD OF THE INVENTION

The present invention relates to a golf ball having excellent flight performance, and more specifically relates to a technology for improving a core rubber composition of a golf ball.

DESCRIPTION OF THE RELATED ART

As a material for forming a core of a golf ball, a rubber composition containing a base rubber, a co-crosslinking agent and a crosslinking initiator is widely used in light of its good resilience.

For example, JP 2018-102693 A discloses a golf ball comprising a spherical core and at least one cover layer covering the spherical core, wherein the spherical core is formed from a rubber composition containing (a) a base rubber, (b) a co-crosslinking agent, and (c) a crosslinking initiator, and (b) the co-crosslinking agent contains a compound represented by a formula (1):

$$(R^1OCO)M(COOR^2)m \qquad (1)$$

in the formula (1), M represents a metal atom, and m represents 1 or 2 wherein when m is 1, $R^1$ and $R^2$ are different from each other and represent an alkenyl group having 2 to 30 carbon atoms or an alkynyl group having 2 to 30 carbon atoms; when m is 2, $R^1$ represents an alkenyl group having 2 to 30 carbon atoms, an alkynyl group having 2 to 30 carbon atoms, an alkyl group having 1 to 30 carbon atoms, or an aryl group having 6 to 30 carbon atoms, two of $R^2$ are identical to or different from each other and represent an alkenyl group having 2 to 30 carbon atoms or an alkynyl group having 2 to 30 carbon atoms; and when m is 2, a compound in which $R^1$ and two of $R^2$ are all identical to each other is excluded.

JP 2018-86179 A discloses a golf ball having a crosslinked molded product of a rubber composition as a constituent element, wherein the rubber composition contains the following components (a) to (d): (a) a base rubber, (b) an α,β-unsaturated carboxylic acid and/or a metal salt thereof, (c) a crosslinking initiator, and (d) a carboxylic acid metal salt in which the carboxylic acid bonded to the metal is of two or more different types and at least one of the carboxylic acids has 8 or more carbon atoms.

US 2018-002510 A discloses a golf ball comprising a core, a cover, and an intermediate layer disposed between the core and the cover, wherein the core contains a blend of a polybutadiene rubber and a fatty acid (meth)acrylic acid salt, where the fatty acid (meth)acrylic acid salt includes a reaction product of a fatty acid, a (meth)acrylic acid monomer, and M(OH)x or MxOy, where M is a metal cation, and x and y independently range from about 1 to about 7, and where the fatty acid (meth)acrylic acid salt is present in the blend in an amount of about 1 phr to about 70 phr.

SUMMARY OF THE INVENTION

In a conventional golf ball, zinc acrylate is used as a co-crosslinking agent. The resilience of the golf ball is improved by using zinc acrylate. However, there is a limit of improving the resilience of a golf ball using zinc acrylate. Thus, it is desired to improve a flight distance of a golf ball by a different method. On the other hand, it is known that the flight distance on driver shots increases if the spin rate on driver shots is decreased. The present invention has been made in view of the above circumstances, and an object of the present invention is to provide a golf ball having a decreased spin rate on driver shots.

The present invention that has solved the above problem provides a golf ball comprising a spherical core and at least one cover layer covering the spherical core, wherein the spherical core is formed from a rubber composition containing (a) a base rubber, (b) a co-crosslinking agent, and (c) a crosslinking initiator, and (b) the co-crosslinking agent contains a compound represented by the formula (1):

$$(R^1OCO)M(COOR^2)m \qquad (1)$$

in the formula (1), M represents a metal atom, m represents 1 or 2, $R^1$ and $R^2$ are different from each other, represent an alkenyl group having 2 to 30 carbon atoms or an alkynyl group having 2 to 30 carbon atoms and have a carbon-carbon double bond or a carbon-carbon triple bond at an α-position carbon atom bonding to a carbonyl group, and when m is 2, two of $R^2$ may be identical to or different from each other.

According to the present invention, a golf ball having a decreased spin rate on driver shots is obtained.

BRIEF DESCRIPTION OF THE DRAWINGS

The FIGURE is a partially cutaway cross-sectional view of a golf ball according to one embodiment of the present invention.

DESCRIPTION OF THE PREFERRED EMBODIMENT

The present invention that has solved the above problem provides a golf ball comprises a spherical core and at least one cover layer covering the spherical core, wherein the spherical core is formed from a rubber composition containing (a) a base rubber, (b) a co-crosslinking agent, and (c) a crosslinking initiator, and (b) the co-crosslinking agent contains a compound represented by the formula (1):

$$(R^1OCO)M(COOR^2)m \qquad (1)$$

in the formula (1), M represents a metal atom, m represents 1 or 2, $R^1$ and $R^2$ are different from each other, represent an alkenyl group having 2 to 30 carbon atoms or an alkynyl group having 2 to 30 carbon atoms and have a carbon-carbon double bond or a carbon-carbon triple bond at an α-position carbon atom bonding to a carbonyl group, and when m is 2, two of $R^2$ may be identical to or different from each other.

[Spherical Core]

The spherical core is formed from a rubber composition containing (a) a base rubber, (b) a co-crosslinking agent and (c) a crosslinking initiator.

((a) Base Rubber)

As (a) the base rubber, a natural rubber and/or a synthetic rubber can be used. For example, a polybutadiene rubber, a natural rubber, a polyisoprene rubber, a styrene polybutadiene rubber, or an ethylene-propylene-diene rubber (EPDM) can be used. These rubbers may be used solely, or at least two of these rubbers may be used in combination. Among them, particularly preferred is a high-cis polybutadiene having a cis-1,4 bond in an amount of 40 mass % or more, preferably 80 mass % or more, and more preferably 90 mass % or more in view of their superior resilience. The amount of the high-cis polybutadiene in (a) the base rubber is preferably 50 mass % or more, more preferably 70 mass % or more.

The high-cis polybutadiene preferably has a 1,2-vinyl bond in an amount of 2 mass % or less, more preferably 1.7 mass % or less, and even more preferably 1.5 mass % or less. If the amount of the 1,2-vinyl bond is excessively high, the resilience may be lowered.

The high-cis polybutadiene is preferably a polybutadiene synthesized using a rare earth element catalyst. When a neodymium catalyst, which employs a neodymium compound that is a lanthanum series rare earth element compound, is used, a polybutadiene rubber having a high content of a cis-1,4 bond and a low content of a 1,2-vinyl bond is obtained with excellent polymerization activity. Such a polybutadiene rubber is particularly preferred.

The high-cis polybutadiene preferably has a Mooney viscosity ($ML_{1+4}$ (100° C.)) of 30 or more, more preferably 32 or more, even more preferably 35 or more, and preferably has a Mooney viscosity ($ML_{1+4}$ (100° C.)) of 140 or less, more preferably 120 or less, even more preferably 100 or less, and most preferably 80 or less. It is noted that the Mooney viscosity ($ML_{1+4}$ (100° C.)) in the present invention is a value measured according to JIS K6300-1 (2013) using an L rotor under the conditions of: a preheating time of 1 minute; a rotor revolution time of 4 minutes; and a temperature of 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cis polybutadiene is excessively low, the processability deteriorates. If the molecular weight distribution (Mw/Mn) of the high-cis polybutadiene is excessively high, the resilience may be lowered. It is noted that the measurement of the molecular weight distribution is conducted by gel permeation chromatography ("HLC-8120GPC", available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

((b) Co-Crosslinking Agent)

(b) The co-crosslinking agent contains a compound represented by the formula (1). If the compound represented by the formula (1) is blended as the co-crosslinking agent, the spin rate on driver shots is lowered.

$$(R^1OCO)M(COOR^2)_m \quad (1)$$

In the formula (1), M represents a metal atom, m represents 1 or 2, $R^1$ and $R^2$ are different from each other, represent an alkenyl group having 2 to 30 carbon atoms or an alkynyl group having 2 to 30 carbon atoms and have a carbon-carbon double bond or a carbon-carbon triple bond at an α-position carbon atom bonding to a carbonyl group, and when m is 2, two of $R^2$ may be identical to or different from each other.

Examples of the metal atom (M) include an alkaline earth metal such as calcium, strontium, and barium; a transition metal such as scandium, titanium, vanadium, chrome, manganese, iron, cobalt, nickel, copper, yttrium, zirconium, niobium, molybdenum, technetium, ruthenium, rhodium, palladium, silver, hafnium, tantalum, tungsten, rhenium, osmium, indium, platinum, and gold; and a base metal such as beryllium, magnesium, aluminum, zinc, gallium, cadmium, indium, tin, thallium, lead, bismuth, and polonium. The metal atom may be used solely, or two or more of them may be used in combination. Among them, as the metal atom, the metal atom forming a divalent or trivalent metal ion is preferable, at least one metal atom selected from the group consisting of beryllium, magnesium, calcium, zinc, barium, cadmium, lead and aluminum is more preferable.

The alkenyl group having 2 to 30 carbon atoms may be linear or branched, and is preferably linear. The alkenyl group has the carbon-carbon double bond at an α-position carbon atom bonding to the carbonyl group in the formula (1).

The alkenyl group having 2 to 30 carbon atoms preferably has at least one carbon-carbon double bond. Examples of the alkenyl group having 2 to 30 carbon atoms include an alkenyl group having one carbon-carbon double bond, and an alkenyl group having two carbon-carbon double bonds. The two carbon-carbon double bonds of the alkenyl group having two carbon-carbon double bonds are preferably conjugated.

The number of carbon atoms included in the alkenyl group is preferably 2 or more, and is preferably 30 or less, more preferably 20 or less, and even more preferably 10 or less.

Examples of the alkenyl group having 2 to 30 carbon atoms and having one carbon-carbon double bond include ethenyl group (C2: vinyl group), 1-propenyl group (C3), isopropenyl group (C3), 1-butenyl group (C4), 1-pentenyl group (C5), 1-hexenyl group (C6), 1-heptenyl group (C7), 1-octenyl group (C8), 1-nonenyl group (C9), 1-decenyl group (C10), 1-undecenyl group (C11), 1-dodecenyl group (C12), 1-tridecenyl group (C13), 1-tetradecenyl group (C14), 1-pentadecenyl group (C15), 1-hexadecenyl group (C16), 1-heptadecenyl group (C17), 1-octadecenyl group (C18), 1-nonadecenyl group (C19), 1-icocenyl group (C20), 1-henicosenyl group (C21), 1-docosenyl group (C22), 1-tricosenyl group (C23), 1-tetracosenyl group (C24), 1-pentacosenyl group (C25), 1-hexacosenyl group (C26), 1-heptacosenyl group (C27), 1-octacosenyl group (C28), 1-nonacosenyl group (C29), and 1-triacontenyl group (C30).

Examples of the alkenyl group having 4 to 30 carbon atoms and having two carbon-carbon double bonds include 1,3-butadienyl group (C4), 1,3-pentadienyl group (C5), 1,3-hexadienyl group (C6), 1,3-heptadienyl group (C7), 1,3-octadienyl group (C8), 1,3-nonadienyl group (C9), 1,3-decadienyl group (C10), 1,3-undecadienyl group (C11), 1,3-dodecadienyl group (C12), 1,3-tridecadienyl group (C13), 1,3-tetradecadienyl group (C14), 1,3-pentadecadienyl group (C15), 1,3-hexadecadienyl group (C16), 1,3-heptadecadienyl group (C17), 1,3-octadecadienyl group (C18), 1,3-nonadecadienyl group (C19), 1,3-icosadienyl group (C20), 1,3-henicosadienyl group (C21), 1,3-docosadienyl group (C22), 1,3-trcosadienyl group (C23), 1,3-tetracosadienyl group (C24), 1,3-pentacosadienyl group (C25), 1,3-hexacosadienyl group (C26), 1,3-heptacosadienyl group (C27), 1,3-octacosadienyl group (C28), 1,3-nonacosadienyl group (C29), and 1,3-tracontadienyl group (C30).

As the alkenyl group having the carbon-carbon double bond, for example, ethenyl group (C2: vinyl group), 1-propenyl group (C3), isopropenyl group (C3), 1,3-butadienyl group (C4) or 1,3-pentadienyl group (C5) is preferable.

The alkynyl group having 2 to 30 carbon atoms may be linear or branched, and is preferably linear. The alkynyl group having 2 to 30 carbon atoms has a carbon-carbon triple bond at the α-position carbon atom bonding to the carbonyl group in the formula (1). The alkynyl group having 2 to 30 carbon atoms preferably has at least one carbon-carbon triple bond. Examples of the alkynyl group having 2 to 30 carbon atoms include an alkynyl group having one carbon-carbon triple bond, and an alkynyl group having two carbon-carbon triple bonds.

The number of carbon atoms included in the alkynyl group is preferably 2 or more, and is preferably 30 or less, more preferably 20 or less, and even more preferably 10 or less.

Examples of the alkynyl group having 2 to 30 carbon atoms include ethynyl group (C2), 1-propynyl group (C3), 1-butynyl group (C4), 1-pentynyl group (C5), 1-hexynyl group (C6), 1-heptynyl group (C7), 1-octynyl group (C8), 1-nonynyl group (C9), 1-decynyl group (C10), 1-undecynyl group (C11), 1-dodecynyl group (C12), 1-tridecynyl group (C13), 1-tetradecynyl group (C14), 1-pentadecynyl group (C15), 1-hexadecynyl group (C16), 1-heptadecynyl group (C17), 1-octadecynyl group (C18), 1-nonadecynyl group (C19), 1-icosynyl group (C20), 1-henicosynyl group (C21), 1-docosynyl group (C22), 1-tricosynyl group (C23), 1-tetracosynyl group (C24), 1-pentacosynyl group (C25), 1-hexacosynyl group (C26), 1-heptacosynyl group (C27), 1-octacosynyl group (C28), 1-nonacosynyl group (C29), and 1-triacontynyl group (C30).

Examples of the alkynyl group having the carbon-carbon triple bond include ethynyl group (C2), 1-propynyl group (C3), and 1-butynyl group (C4).

In the compound represented by the formula (1), the number of carbon atoms included in $R^1$ is preferably 2 or more, and is preferably 6 or less, more preferably 3 or less. As $R^1$, ethenyl group (vinyl group) or isopropenyl group is preferable, ethenyl group (vinyl group) is more preferable.

In the compound represented by the formula (1), the number of carbon atoms included in $R^2$ is preferably 2 or more, more preferably 3 or more, and is preferably 6 or less. As $R^2$, 1-propenyl group, 1,3-butadienyl group or 1,3-pentadienyl group is preferable, 1-propenyl group or 1,3-butadienyl group is more preferable, and 1-propenyl group is even more preferable.

Specific examples of the compound represented by the formula (1) include a compound in which m=1, $R^1$=ethenyl group (vinyl group) and $R^2$=1-propenyl group; a compound in which m=1, $R^1$=ethenyl group (vinyl group) and $R^2$=1,3-butadienyl group; a compound in which m=1, $R^1$=ethenyl group (vinyl group) and $R^2$=1,3-pentadienyl group.

[Preparation of the Compound Represented by the Formula (1)]

The compound represented by the formula (1) can be obtained by a reaction between a carboxylic acid and a metal oxide. Specific examples of the preparation method include a method of mixing a metal oxide, and at least a first carboxylic acid and a second carboxylic acid in a solvent.

Examples of the metal oxide include an oxide of an alkaline earth metal, such as calcium oxide, strontium oxide, and barium oxide; an oxide of a transition metal, such as scandium oxide, titanium oxide, vanadium oxide, chrome oxide, manganese oxide, iron oxide, cobalt oxide, nickel oxide, copper oxide, yttrium oxide, zirconium oxide, niobium oxide, molybdenum oxide, technetium oxide, ruthenium oxide, rhodium oxide, palladium oxide, silver oxide, hafnium oxide, tantalum oxide, tungsten oxide, rhenium oxide, osmium oxide, iridium oxide, platinum oxide, and gold oxide; and an oxide of a base metal, such as beryllium oxide, magnesium oxide, aluminum oxide, zinc oxide, gallium oxide, cadmium oxide, indium oxide, tin oxide, thallium oxide, lead oxide, bismuth oxide, and polonium oxide. The metal oxide may be used solely, or two or more of them may be used in combination. Among them, as the metal oxide, the oxide of the divalent metal is preferable, beryllium oxide, magnesium oxide, calcium oxide, zinc oxide, barium oxide, cadmium oxide or lead oxide is more preferable.

Examples of the carboxylic acid include an unsaturated fatty acid having 3 to 30 carbon atoms. Examples of the unsaturated fatty acid include an unsaturated fatty acid having a carbon-carbon double bond, and an unsaturated fatty acid having a carbon-carbon triple bond. The carbon-carbon double bond or carbon-carbon triple bond is preferably at the α-position (2-position) carbon atom bonding to the carboxyl group.

The unsaturated fatty acid having the carbon-carbon double bond preferably has at least one carbon-carbon double bond. Examples of the unsaturated fatty acid having the carbon-carbon double bond include an unsaturated fatty acid having one carbon-carbon double bond, and an unsaturated fatty acid having two carbon-carbon double bonds. The two carbon-carbon double bonds of the unsaturated fatty acid having two carbon-carbon double bonds is preferably conjugated.

The number of carbon atoms included in the unsaturated fatty acid having the carbon-carbon double bond is preferably 3 or more, and is preferably 30 or less, more preferably 20 or less, and even more preferably 10 or less.

Examples of the unsaturated fatty acid having one carbon-carbon double bond include 2-propenoic acid (C3: acrylic acid), 2-methyl-2-propenoic acid (C4: methacrylic acid), 2-butenoic acid (C4: crotonic acid), 2-pentenoic acid (C5), 2-hexenoic acid (C6), 2-heptenoic acid (C7), 2-octenoic acid (C8), 2-nonenoic acid (C9), 2-decenoic acid (C10), 2-undecenoic acid (C11), 2-dodecenoic acid (C12), 2-tridecenoic acid (C13), 2-tetradecenoic acid (C14), 2-pentadecenoic acid (C15), 2-hexadecenoic acid (C16), 2-heptadecenoic acid (C17), 2-octadecenoic acid (C18), 2-nonadecenoic acid (C19), 2-icosenoic acid (C20), 2-henicosenoic acid (C21), 2-docosenoic acid (C22), 2-tricosenoic acid (C23), 2-tetracosenoic acid (C24), 2-pentacosenoic acid (C25), 2-hexacosenoic acid (C26), 2-heptacosenoic acid (C27), 2-octacosenoic acid (C28), 2-nonacosenoic acid (C29), and 2-triacontenoic acid (C30).

Examples of the unsaturated fatty acid having two carbon-carbon double bonds include butadienoic acid (C4), pentadienoic acid (C5), hexadienoic acid (C6), heptadienoic acid (C7), octadienoic acid (C8), nonadienoic acid (C9), decadienoic acid (C10), undecadienoic acid (C11), dodecadienoic acid (C12), tridecadienoic acid (C13), tetradecadienoic acid (C14), pentadecadienoic acid (C15), hexadecadienoic acid (C16), heptadecadienoic acid (C17), octadecadienoic acid (C18), nonadecadienoic acid (C19), icosadienoic acid (C20), henicosadienoic acid (C21), docosadienoic acid (C22), tricosadienoic acid (C23), tetracosadienoic acid (C24), pentacosadienoic acid (C25), hexacosadienoic acid (C26), heptacosadienoic acid (C27), octacosadienoic acid (C28), nonacosadienoic acid (C29), and triacontadienoic acid (C30).

The two carbon-carbon double bonds are preferably conjugated. In other words, a 2,4-unsaturated carboxylic acid having carbon-carbon double bonds at carbon atoms at 2-position and 4-position is preferable.

The unsaturated carboxylic acid having the carbon-carbon triple bond preferably has at least one carbon-carbon triple bond. Examples of the unsaturated fatty acid having the carbon-carbon triple bond include an unsaturated fatty acid having one carbon-carbon triple bond, and an unsaturated fatty acid having two carbon-carbon triple bonds.

The number of carbon atoms included in the unsaturated fatty acid having the carbon-carbon triple bond is preferably 3 or more, and is preferably 30 or less, more preferably 20 or less, and even more preferably 10 or less.

Examples of the unsaturated fatty acid having one carbon-carbon triple bond include 2-propiolic acid (C3), 2-butynoic acid (C4), 2-pentynoic acid (C5), 2-hexynoic acid (C6), 2-heptynoic acid (C7), 2-octynoic acid (C8), 2-nonynoic acid (C9), 2-decynoic acid (C10), 2-undecynoic acid (C11), 2-dodecynoic acid (C12), 2-tridecynoic acid (C13), 2-tetradecynoic acid (C14), 2-pentadecynoic acid (C15), 2-hexadecynoic acid (C16), 2-heptadecynoic acid (C17), 2-octadecynoic acid (C18), 2-nonadecynoic acid (C19), 2-icosynoic acid (C20), 2-heneicosynoic acid (C21), 2-docosynoic acid (C22), 2-tricosynoic acid (C23), 2-tetracosynoic acid (C24), 2-pentacosynoic acid (C25), 2-hexacosynoic acid (C26), 2-heptacosynoic acid (C27), 2-octacosynoic acid (C28), 2-nonacosynoic acid (C29), and 2-triacontynoic acid (C30).

In the present invention, as the first carboxylic acid, 2-propenoic acid (acrylic acid) or 2-methyl-2-propenoic acid (methacrylic acid) is preferably used, and 2-propenoic acid (acrylic acid) is more preferably used. In addition, as the second carboxylic acid, 2-butenoic acid (crotonic acid), 2,4-pentadienoic acid or 2,4-hexadienoic acid (sorbic acid) is preferably used, and 2-butenoic acid (crotonic acid) or 2,4-pentadienoic acid is more preferably used.

The amounts of the first carboxylic acid and the second carboxylic acid can be appropriately adjusted depending on the chemical structure of the desired fatty acid metal salt. It is noted that if a product obtained by multiplying the moles of the metal ion in the metal oxide by the valence of this metal ion (a sum of a product obtained by multiplying the moles of each metal ion by the valence of this metal ion when a plurality of metal ions are present) is referred to as X, the moles of the carboxy group in the first carboxylic acid is referred to as $Y_1$, and the moles of the carboxy group in the second carboxylic acid is referred to as $Y_2$, the ratio $((Y_1+Y_2)/X)$ is 0 or more, and is preferably 1.0 or less.

Examples of the solvent include toluene and xylene. The amount of the solvent is preferably 150 mL or more, more preferably 200 mL or more, and is preferably 600 mL or less, more preferably 500 mL or less, with respect to 100 g of the total amount of the carboxylic acids.

The liquid temperature when mixing the metal oxide and the carboxylic acids is preferably 10° C. or more, more preferably 15° C. or more, and is preferably 100° C. or less, more preferably 90° C. or less. The mixing time when mixing the metal oxide and the carboxylic acids can be appropriately adjusted.

When a third carboxylic acid is used as the carboxylic acid in addition to the first carboxylic acid and the second carboxylic acid, the amounts of the first carboxylic acid, the second carboxylic acid and the third carboxylic acid can be appropriately adjusted depending on the chemical structure of the desired fatty acid metal salt. It is noted that if a product obtained by multiplying the moles of the metal ion in the metal oxide by the valence of this metal ion (a sum of a product obtained by multiplying the moles of each metal ion by the valence of this metal ion when a plurality of metal ions are present) is referred to as X, the moles of the carboxy group in the first carboxylic acid is referred to as $Y_1$, the moles of the carboxy group in the second carboxylic acid is referred to as $Y_2$, and the moles of the carboxy group in the third carboxylic acid is referred to as Ys, the ratio $((Y_1+Y_2+Y)/X)$ is 0 or more, and is preferably 1.0 or less.

(b) The co-crosslinking agent may contain other co-crosslinking agent than the compound represented by the general formula (1) if the inventive effect is not impaired. Examples of the other co-crosslinking agent include an α,β-unsaturated carboxylic acid having 3 to 8 carbon atoms and/or a metal salt thereof. The α,β-unsaturated carboxylic acid having 3 to 8 carbon atoms and/or the metal salt thereof has an action of crosslinking a rubber molecule by graft polymerization to a base rubber molecular chain. Examples of the α,β-unsaturated carboxylic acid having 3 to 8 carbon atoms include acrylic acid, methacrylic acid, fumaric acid, maleic acid, and crotonic acid.

Examples of the metal constituting the metal salt of the α,β-unsaturated carboxylic acid having 3 to 8 carbon atoms include a monovalent metal ion such as sodium, potassium and lithium; a divalent metal ion such as magnesium, calcium, zinc, barium and cadmium; a trivalent metal ion such as aluminum; and other ion such as tin and zirconium. The metal component may be used solely, or two or more of them may be used in combination. Among them, as the metal component, the divalent metal such as magnesium, calcium, zinc, barium and cadmium is preferable. This is because if the divalent metal salt of the α,β-unsaturated carboxylic acid having 3 to 8 carbon atoms is used, a metal crosslinking between the rubber molecules easily forms.

In a preferable embodiment according to the present invention, (b) the co-crosslinking agent preferably contains (meth)acrylic acid or the metal salt thereof and the compound represented by the general formula (1), and more preferably contains the metal salt of (meth)acrylic acid and the compound represented by the general formula (1).

The amount of (b) the co-crosslinking agent in the rubber composition is preferably 10 parts by mass or more, more preferably 15 parts by mass or more, and even more preferably 20 parts by mass or more, and is preferably 50 parts by mass or less, more preferably 45 parts by mass or less, and even more preferably 40 parts by mass or less, with respect to 100 parts by mass of (a) the base rubber. If the amount of (b) the co-crosslinking agent is less than 10 parts by mass, the amount of (c) the crosslinking initiator which will be described later must be increased such that the constituent member formed from the rubber composition has an appropriate hardness, which tends to lower the resilience of the crosslinked rubber molded product. On the other hand, if the amount of (b) the co-crosslinking agent is more than 50 parts by mass, the constituent member formed from the rubber composition tends to become excessively hard.

The amount of the compound represented by the general formula (1) in the rubber composition is preferably 3 parts by mass or more, more preferably 3.5 parts by mass or more, and even more preferably 4 parts by mass or more, and is preferably 40 parts by mass or less, more preferably 35 parts by mass or less, and even more preferably 30 parts by mass or less, with respect to 100 parts by mass of (a) the base rubber. If the amount of the compound represented by the general formula (1) falls within the above range, the spin rate on driver shots is further decreased.

((c) Crosslinking Initiator)

(c) The crosslinking initiator is blended to crosslink (a) the base rubber component. As (c) the crosslinking initiator, an organic peroxide is suitable. Specific examples of the organic peroxide include a dialkyl peroxide, a peroxy ester, a peroxy ketal, and a hydroperoxide. Examples of the dialkyl peroxide include di(2-t-butylperoxyisopropyl) benzene (175.4° C.), dicumyl peroxide (175.2° C.), 2,5-dimethyl-2,5-di(t-butylperoxy) hexane (179.8° C.), t-butylcumyl peroxy (173.3° C.), di-t-hexyl peroxy (176.7° C.), di-t-butyl peroxy (185.9° C.), and 2,5-dimethyl-2,5-di(t-butylperoxy) hexyne-3 (194.3° C.). Examples of the peroxy ester include t-butylperoxy maleate (167.5° C.), t-butylperoxy-3,3,5-trimethyl cyclohexanoate (166.0° C.), t-butylperoxy laurate (159.4° C.), t-butylperoxyisopropyl monocarbonate (158.8° C.), t-hexylperoxy benzoate (160.3° C.), 2,5-dimethyl-2,5-di(benzoylperoxy) hexane (158.2° C.), t-butylperoxy acetate (159.9° C.), and t-butylperoxy benzoate (166.8° C.). Examples of the peroxy ketal include 1,1-di(t-hexylperoxy)-3,3,5-trimethyl cyclohexane (147.1° C.), 1,1-di(t-hexylperoxy) cyclohexane (149.2° C.), 1,1-di(t-butylperoxy)-2-methyl cyclohexane (142.1° C.), 1,1-di(t-butylperoxy) cyclohexane (153.8° C.), 2,2-di(t-butylperoxy) butane (159.9° C.), n-butyl-4,4-di(t-butylperoxy) valerate (172.5° C.), and 2,2-di(4,4-di(t-butylperoxy)cyclohexyl) propane (153.8° C.). Examples of the hydroperoxide include p-menthane hydroperoxide (199.5° C.), and diisopropylbenzene hydroperoxide (232.5° C.). The numerical value described in the parenthesis after the compound name of the above organic peroxide is its one-minute half-life temperature. Among them, the dialkyl peroxide and the peroxy ketal are preferable. These organic peroxides may be used solely, or two or more of them may be used in combination. It is noted that when two or more of the above organic peroxides are used in combination, the difference between the maximum value and the minimum value of the one-minute half-life temperatures of the used organic peroxides is preferably 25° C. or less, more preferably 10° C. or less.

The amount of (c) the crosslinking initiator is preferably 0.2 part by mass or more, more preferably 0.5 part by mass or more, and is preferably 5.0 parts by mass or less, more preferably 2.5 parts by mass or less, with respect to 100 parts by mass of (a) the base rubber. If the amount of (c) the crosslinking initiator is less than 0.2 part by mass, the constituent member formed from the rubber composition is so soft that the resilience of the golf ball tends to be lowered, and if the amount of (c) the crosslinking initiator is more than 5.0 parts by mass, the amount of (b) the co-crosslinking agent described above must be decreased such that the constituent member formed from the rubber composition has an appropriate hardness, which tends to lower the resilience or worsen the durability of the golf ball.

((d) Metal Compound)

When the α,β-unsaturated carboxylic acid having 3 to 8 carbon atoms is used as the co-crosslinking agent, the rubber composition preferably further contains (d) a metal compound. (d) The metal compound is not particularly limited, as long as the metal compound is capable of neutralizing the α,β-unsaturated carboxylic acid having 3 to 8 carbon atoms blended as the co-crosslinking agent in the rubber composition. Examples of (d) the metal compound include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate. As (d) the metal compound, the divalent metal compound is preferable, the zinc compound is more preferable. This is because the divalent metal compound reacts with the α,β-unsaturated carboxylic acid having 3 to 8 carbon atoms to form a metal crosslinking. In addition, if the zinc compound is used, the obtained golf ball has better resilience. (d) The metal compound may be used solely, or at least two of them may be used in combination.

[(e) Organic Sulfur Compound]

The rubber composition may further contain (e) an organic sulfur compound. Examples of (e) the organic sulfur compound include at least one member selected from the group consisting of thiophenols, thionaphthols, polysulfides, thiurams, thiocarboxylic acids, dithiocarboxylic acids, sulfenamides, dithiocarbamates, thiazoles, and their metal salts. In the viewpoint of increasing the hardness distribution of the spherical core, as (e) the organic sulfur compound, the organic sulfur compound having the thiol group (—SH), or the metal salt thereof is preferable, and thiophenols, thionaphthols or their metal salts are preferable.

Examples of the thiols include thiophenols and thionaphthols. Examples of the thiophenols include thiophenol; thiophenols substituted with a fluoro group, such as 4-fluorothiophenol, 2,5-difluorothiophenol, 2,6-difluorothiophenol, 2,4,5-trifluorothiophenol, 2,4,5,6-tetrafluorothiophenol and pentafluorothiophenol; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol and pentachlorothiophenol; thiophenols substituted with a bromo group, such as 4-bromothiophenol, 2,5-dibromothiophenol, 2,6-dibromothiophenol, 2,4,5-tribromothiophenol, 2,4,5,6-tetrabromothiophenol and pentabromothiophenol; thiophenols substituted with an iodo group, such as 4-iodothiophenol, 2,5-diiodothiophenol, 2,6-diiodothiophenol, 2,4,5-triiodothiophenol, 2,4,5,6-tetraiodothiophenol and pentaiodothiophenol; and metal salts thereof. As the metal salt, zinc salt is preferable.

Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and metal salts thereof. Among them, 2-thionaphthol, 1-thionaphthol, and metal salts thereof are preferable. As the metal salt, a divalent metal salt is preferable, zinc salt is more preferable. Specific examples of the metal salt include zinc salt of 1-thionaphthol and zinc salt of 2-thionaphthol.

The polysulfides are organic sulfur compounds having a polysulfide bond, and examples thereof include disulfides, trisulfides, and tetrasulfides. As the polysulfides, diphenyl polysulfides are preferable.

Examples of the diphenyl polysulfides include diphenyl disulfide; diphenyl disulfides substituted with a halogen group, such as bis(4-fluorophenyl) disulfide, bis(2,5-difluorophenyl) disulfide, bis(2,6-difluorophenyl) disulfide, bis(2,4,5-trifluorophenyl) disulfide, bis(2,4,5,6-tetrafluorophenyl) disulfide, bis(pentafluorophenyl) disulfide, bis(4-chlorophenyl) disulfide, bis(2,5-dichlorophenyl) disulfide, bis(2,6-dichlorophenyl) disulfide, bis(2,4,5-trichlorophenyl) disulfide, bis(2,4,5,6-tetrachlorophenyl) disulfide, bis(pentachlorophenyl) disulfide, bis(4-bromophenyl) disulfide, bis(2,5-dibromophenyl) disulfide, bis(2,6-dibromophenyl) disulfide, bis(2,4,5-tribromophenyl) disulfide, bis(2,4,5,6-tetrabromophenyl) disulfide, bis(pentabromophenyl) disulfide, bis(4-iodophenyl) disulfide, bis(2,5-diiodophenyl) disulfide, bis(2,6-diiodophenyl) disulfide, bis(2,4,5-triodophenyl) disulfide, bis(2,4,5,6-tetraiodophenyl) disulfide and bis(pentaiodophenyl) disulfide; and diphenyl disulfides substituted with an alkyl group, such as bis(4-methylphenyl) disulfide, bis(2,4,5-trimethylphenyl) disulfide, bis(pentamethylphenyl) disulfide, bis(4-t-butylphenyl) disulfide, bis(2,4,5-tri-t-butylphenyl) disulfide, and bis(penta-t-butylphenyl) disulfide.

Examples of the thiurams include thiuram monosulfides such as tetramethylthiuram monosulfide; thiuram disulfides such as tetramethylthiuram disulfide, tetraethylthiuram disulfide and tetrabutylthiuram disulfide; and thiuram tetrasulfides such as dipentamethylenethiuram tetrasulfide. Examples of the thiocarboxylic acids include naphthalene thiocarboxylic acid. Examples of the dithiocarboxylic acids include naphthalene dithiocarboxylic acid. Examples of the sulfenamides include N-cyclohexyl-2-benzothiazole sulfenamide, N-oxydiethylene-2-benzothiazole sulfenamide, and N-t-butyl-2-benzothiazole sulfenamide.

(e) The organic sulfur compound may be used solely, or two or more of them may be used in combination. As (e) the organic sulfur compound, the thiophenols and/or the metal salts thereof, the thionaphthols and/or the metal salts thereof, the diphenyl disulfides, and the thiuram disulfides are preferable, 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyl disulfide, bis(2,6-difluorophenyl) disulfide, bis(2,6-dichlorophenyl) disulfide, bis(2,6-dibromophenyl) disulfide, bis(2,6-diiodophenyl) disulfide, and bis(pentabromophenyl) disulfide are more preferable.

The amount of (e) the organic sulfur compound is preferably 0.05 part by mass or more, more preferably 0.1 part by mass or more, and is preferably 5.0 parts by mass or less, more preferably 2.0 parts by mass or less, with respect to 100 parts by mass of (a) the base rubber. If the amount of (e) the organic sulfur compound is less than 0.05 part by mass, the effect of adding (e) the organic sulfur compound may not be obtained, and the resilience of the golf ball may not be enhanced. In addition, if the amount of (e) the organic sulfur compound is more than 5.0 parts by mass, the obtained golf ball has a great compression deformation amount and thus the resilience thereof may be lowered.

((f) Carboxylic Acid and/or Salt Thereof)

The rubber composition may contain (f) a carboxylic acid and/or a salt thereof. If (f) the carboxylic acid and/or the salt thereof is contained, the obtained spherical core can have a greater outer-hard and inner-soft degree. Examples of (f) the carboxylic acid and/or the salt thereof include an aliphatic carboxylic acid, an aliphatic carboxylic acid salt, an aromatic carboxylic acid, and an aromatic carboxylic acid salt. (f) The carboxylic acid and/or the salt thereof may be used solely, or two or more of them may be used in combination.

The aliphatic carboxylic acid may be either a saturated aliphatic carboxylic acid (hereinafter sometimes referred to as "saturated fatty acid") or an unsaturated aliphatic carboxylic acid (hereinafter sometimes referred to as "unsaturated fatty acid"). In addition, the aliphatic carboxylic acid may have a branched or cyclic structure. The number of carbon atoms included in the saturated fatty acid is preferably 1 or more, and is preferably 30 or less, more preferably 18 or less, and even more preferably 13 or less. The number of carbon atoms included in the unsaturated fatty acid is preferably 5 or more, more preferably 7 or more, and even more preferably 8 or more, and is preferably 30 or less, more preferably 18 or less, and even more preferably 13 or less. It is noted that (f) the carboxylic acid and/or the salt thereof excludes (b) the α,β-unsaturated carboxylic acid having 3 to 8 carbon atoms and/or the metal salt thereof used as the co-crosslinking agent.

Examples of the aromatic carboxylic acid include a carboxylic acid having a benzene ring in the molecule, and a carboxylic acid having an aromatic heterocycle in the molecule. The aromatic carboxylic acid may be used solely, or two or more of them may be used in combination. Examples of the carboxylic acid having the benzene ring include an aromatic carboxylic acid having a carboxyl group directly bonding to a benzene ring, an aromatic-aliphatic carboxylic acid having an aliphatic carboxylic acid bonding to a benzene ring, a polynuclear aromatic carboxylic acid having a carboxyl group directly bonding to a fused benzene ring, and a polynuclear aromatic-aliphatic carboxylic acid having an aliphatic carboxylic acid bonding to a fused benzene ring. Examples of the carboxylic acid having the aromatic heterocycle include a carboxylic acid having a carboxyl group directly bonding to an aromatic heterocycle.

As the aliphatic carboxylic acid salt or aromatic carboxylic acid salt, salts of the above mentioned aliphatic carboxylic acid or aromatic carboxylic acid can be used. Examples of the cation component of these salts include a metal ion, an ammonium ion, and an organic cation. Examples of the metal ion include a monovalent metal ion such as sodium, potassium, lithium and silver; a divalent metal ion such as magnesium, calcium, zinc, barium, cadmium, copper, cobalt, nickel and manganese; a trivalent metal ion such as aluminum and iron; other ion such as tin, zirconium and titanium. The cation component may be used solely, or two or more of them may be used in combination.

The organic cation is a cation having a carbon chain. The organic cation is not particularly limited, and examples thereof include an organic ammonium ion. Examples of the organic ammonium ion include a primary ammonium ion such as stearyl ammonium ion, hexyl ammonium ion, octyl ammonium ion and 2-ethylhexyl ammonium ion; a secondary ammonium ion such as dodecyl(lauryl) ammonium ion and octadecyl(stearyl) ammonium ion; a tertiary ammonium ion such as trioctyl ammonium ion; and a quaternary ammonium ion such as dioctyldimethyl ammonium ion and distearyldimethyl ammonium ion. These organic cations may be used solely, or two or more of them may be used in combination.

Examples of the aliphatic carboxylic acid and/or the salt thereof include a saturated fatty acid and/or a salt thereof, and an unsaturated fatty acid and/or a salt thereof. The saturated fatty acid and/or the salt thereof is preferable, caprylic acid (octanoic acid), pelargonic acid (nonanoic acid), capric acid (decanoic acid), lauric acid, myristic acid, palmitic acid, stearic acid, behenic acid, and their potassium salt, magnesium salt, calcium salt, aluminum salt, zinc salt, iron salt, copper salt, nickel salt and cobalt salt, are preferable. As the unsaturated fatty acid and/or the salt thereof, palmitoleic acid, oleic acid, linoleic acid, arachidonic acid, and their potassium salt, magnesium salt, calcium salt, aluminum salt, zinc salt, iron salt, copper salt, nickel salt and cobalt salt, are preferable.

As the aromatic carboxylic acid and/or the salt thereof, benzoic acid, butylbenzoic acid, anisic acid (methoxybenzoic acid), dimethoxybenzoic acid, trimethoxybenzoic acid, dimethylaminobenzoic acid, chlorobenzoic acid, dichlorobenzoic acid, trichlorobenzoic acid, acetoxybenzoic acid, biphenylcarboxylic acid, naphthalenecarboxylic acid, anthracenecarboxylic acid, furancarboxylic acid, thenoic acid, and their potassium salt, magnesium salt, calcium salt, aluminum salt, zinc salt, iron salt, copper salt, nickel salt and cobalt salt, are particularly preferable.

The amount of (f) the carboxylic acid and/or the salt thereof, for example, is preferably 0.5 part by mass or more, more preferably 1.0 part by mass or more, and even more preferably 1.5 parts by mass or more, and is preferably 40 parts by mass or less, more preferably 35 parts by mass or less, and even more preferably 30 parts by mass or less, with respect to 100 parts by mass of (a) the base rubber. If the amount of (f) the carboxylic acid and/or the salt thereof is 0.5 part by mass or more, the spherical core have a greater outer-hard and inner-soft degree, and if the amount of (f) the carboxylic acid and/or the salt thereof is 40 parts by mass or less, lowering in the core hardness is suppressed, and thus the resilience is better.

The rubber composition may further contain an additive such as a pigment, a filler for adjusting weight or the like, an antioxidant, a peptizing agent, and a softener, where necessary. In addition, the rubber composition may contain a rubber powder obtained by pulverizing a golf ball core or offcuts produced when preparing a core.

Examples of the pigment blended in the rubber composition include a white pigment, a blue pigment, and a purple pigment. As the white pigment, titanium oxide is preferably used. The type of titanium oxide is not particularly limited, but rutile type is preferably used because of the high opacity. In addition, the amount of titanium oxide is preferably 0.5 part by mass or more, more preferably 2 parts by mass or more, and is preferably 8 parts by mass or less, more preferably 5 parts by mass or less, with respect to 100 parts by mass of (a) the base rubber.

It is also preferred that the rubber composition contains both a white pigment and a blue pigment. The blue pigment is blended in order to cause white color to be vivid, and examples thereof include ultramarine blue, cobalt blue, and phthalocyanine blue. In addition, examples of the purple pigment include anthraquinone violet, dioxazine violet, and methyl violet.

The filler blended in the rubber composition is mainly used as a weight adjusting agent for adjusting the weight of the golf ball obtained as a final product, and may be blended where necessary. Examples of the filler include an inorganic filler such as zinc oxide, barium sulfate, calcium carbonate, magnesium oxide, tungsten powder, and molybdenum powder.

The amount of the antioxidant is preferably 0.1 part by mass or more and is preferably 1 part by mass or less with respect to 100 parts by mass of (a) the base rubber. In addition, the amount of the peptizing agent is preferably 0.1 part by mass or more and is preferably 5 parts by mass or less with respect to 100 parts by mass of (a) the base rubber.

[Preparation of Rubber Composition]

The rubber composition used in the present invention can be obtained by mixing and kneading (a) the base rubber, (b) the co-crosslinking agent, (c) the crosslinking initiator, and other optional additives or the like used where necessary. The kneading method is not particularly limited. For example, the kneading can be conducted with a conventional kneading machine such as a kneading roll, a banbury mixer and a kneader.

Next, the step of heat-pressing the rubber composition to form the spherical core will be explained. First, the rubber composition is extruded into a rod shape with an extruding machine and cut into a predetermined length, to prepare a preliminarily molded product (also referred to as "plug"). In the case that an extruding machine is used for the preparation of the plug, the rubber composition during kneading may be heated, but the heating temperature is preferably 75° C. or less. Alternatively, the plug can be prepared by molding the core rubber composition into a sheet shape having a certain thickness and punching the sheet shaped core rubber composition. The size of the plug can be appropriately varied depending on the size of the mold for compression molding. The obtained plug is preferably, for example, immersed into an anti-adhesion agent liquid such that the plug does not adhere to each other, and aged for about 8 to 48 hours after being dried.

Subsequently, the plug is charged into the mold for molding the core and press-molded. In the production method according to the present invention, in the step of heat-pressing the rubber composition to form the spherical core, the rubber composition is preferably heat-pressed at a pressing temperature in a range of from t-60° C. to t-15° C. to form the spherical core, when the one-minute half-life temperature of (c) the crosslinking initiator is referred to as t ° C. If the heat-pressing temperature falls within the above range, the hardness at the point located at the distance of 37.5% of the core radius from the center of the obtained spherical core can be selectively lowered, and the spin rate on driver shots can be decreased. It is noted that the pressing temperature in the present invention is a set temperature of the press-molding machine.

The heat-pressing temperature is preferably t-60° C. or more, more preferably t-50° C. or more, and even more preferably t-40° C. or more, and is preferably t-15° C. or less, more preferably t-20° C. or less. If the heat-pressing temperature is t-60° C. or more, the outer-hard and inner-soft degree of the core can be increased, and if the heat-pressing temperature is t-15° C. or less, an optimal hardness distribution is obtained, and thus the spin rate decrease effect is greater. It is noted that when the rubber composition contains two or more of (c) the crosslinking initiators, the heat-pressing temperature is necessarily adjusted such that the heat-pressing temperature satisfies the above range regarding the one-minute half-life temperatures of all of (c) the crosslinking initiators.

The heat-pressing temperature is preferably 120° C. or more, more preferably 130° C. or more, and is preferably 170° C. or less. The molding time is preferably 10 minutes or more, more preferably 12 minutes or more, and even more preferably 15 minutes or more, and is preferably 60 minutes or less, more preferably 50 minutes or less, and even more preferably 45 minutes or less. In addition, the pressure at the molding preferably ranges from 2.9 MPa to 11.8 MPa.

The center hardness Ho of the spherical core is preferably 30 or more, more preferably 35 or more, and even more preferably 40 or more in Shore C hardness. If the center hardness Ho of the spherical core is 30 or more in Shore C hardness, the spherical core is not excessively soft, and thus the resilience is better. In addition, the center hardness Ho of the spherical core is preferably 70 or less, more preferably 65 or less, and even more preferably 60 or less in Shore C hardness. If the center hardness Ho of the spherical core is 70 or less in Shore C hardness, the spherical core is not excessively hard, and thus the shot feeling is better.

The surface hardness Hs of the spherical core is preferably 65 or more, more preferably 70 or more, and even more preferably 72 or more, and is preferably 100 or less, more preferably 95 or less, and even more preferably 90 or less in Shore C hardness. If the surface hardness of the spherical core is 65 or more in Shore C hardness, the spherical core is not excessively soft, and thus the resilience is better. In addition, if the surface hardness of the spherical core is 100 or less in Shore C hardness, the spherical core is not excessively hard, and thus the shot feeling is better.

The hardness difference (Hs–Ho) between the surface hardness Hs of the spherical core and the center hardness Ho of the spherical core is preferably 0 or more, more preferably 10 or more, even more preferably 15 or more, and most preferably 20 or more, and is preferably 60 or less, more preferably 55 or less, and even more preferably 50 or less in Shore C hardness. If the hardness difference is great, the obtained golf ball has a high launch angle and a low spin rate, and thus travels a great flight distance.

The spherical core formed from the rubber composition used in the present invention has the low hardness H37.5 at the point located at the distance of 37.5% of the core radius from the center of the spherical core. If the spherical core having the low H37.5 is used, the obtained golf ball has a decreased spin rate on driver shots. From this viewpoint, the hardness H37.5 at the point located at the distance of 37.5% of the core radius from the center of the spherical core is preferably 40 or more, more preferably 45 or more, and even more preferably 50 or more, and is preferably 75 or less, more preferably 70 or less, and even more preferably 69 or less in Shore C hardness.

The ratio ((H37.5−Ho)/(Hs−Ho)) of the hardness difference (H37.5−Ho) between the hardness H37.5 at the point located at the distance of 37.5% of the core radius from the center of the spherical core and the center hardness Ho of the spherical core to the hardness difference (Hs−Ho) between the center hardness Ho of the spherical core and the surface hardness Hs of the spherical core is preferably 0.1 or more, more preferably 0.2 or more, and is preferably 0.40 or less, more preferably 0.38 or less, and even more preferably 0.36 or less. The ratio ((H37.5−Ho)/(Hs−Ho)) represents a relative hardness of the hardness H37.5 at the point located at the distance of 37.5% of the core radius from the core center to the hardness difference (Hs−Ho) between the surface hardness and the center hardness. If the ratio (H37.5−Ho)/(Hs−Ho) falls within the above range, the spin rate on driver shots is further decreased.

The diameter of the spherical core is preferably 34.8 mm or more, more preferably 36.8 mm or more, and even more preferably 38.8 mm or more, and is preferably 42.2 mm or less, more preferably 41.8 mm or less, even more preferably 41.2 mm or less, and most preferably 40.8 mm or less. If the diameter of the spherical core is 34.8 mm or more, the cover is not excessively thick, and thus the resilience is better. On the other hand, if the diameter of the spherical core is 42.2 mm or less, the cover is not excessively thin, and thus the cover functions better.

When the spherical core has a diameter in a range of from 34.8 mm to 42.2 mm, the compression deformation amount (shrinking amount along the compression direction) of the spherical core when applying a load from 98 N as an initial load to 1275 N as a final load to the spherical core is preferably 2.0 mm or more, more preferably 2.8 mm or more, and is preferably 6.0 mm or less, more preferably 5.0 mm or less. If the compression deformation amount is 2.0 mm or more, the shot feeling is better, and if the compression deformation amount is 6.0 mm or less, the resilience is better.

[Cover]

The cover of the golf ball is formed from a cover composition containing a resin component. Examples of the resin component include an ionomer resin, a thermoplastic polyurethane elastomer having a trade name of "Elastollan (registered trademark)" available from BASF Japan Ltd., a thermoplastic polyamide elastomer having a trade name of "Pebax (registered trademark)" available from Arkema K. K., a thermoplastic polyester elastomer having a trade name of "Hytrel (registered trademark)" available from Du Pont-Toray Co., Ltd., and a thermoplastic styrene elastomer having a trade name of "TEFABLOC (registered trademark)" available from Mitsubishi Chemical Corporation.

The cover composition for forming the cover of the golf ball in the present invention preferably contains a thermoplastic polyurethane elastomer or an ionomer resin as the resin component. It is also preferred that when the ionomer resin is used, a thermoplastic styrene elastomer is used in combination. The amount of the polyurethane or ionomer resin in the resin component of the cover composition is preferably 50 mass % or more, more preferably 60 mass % or more, and even more preferably 70 mass % or more.

In addition to the resin component, the cover composition may further contain a pigment component such as a white pigment (e.g. titanium oxide), a blue pigment and a red pigment, a weight adjusting agent such as zinc oxide, calcium carbonate and barium sulfate, a dispersant, an antioxidant, an ultraviolet absorber, a light stabilizer, a fluorescent material or fluorescent brightener, as long as they do not impair the performance of the cover.

The amount of the white pigment (e.g. titanium oxide) is preferably 0.5 part or more, more preferably 1 part or more, and is preferably 10 parts or less, more preferably 8 parts or less, with respect to 100 parts by mass of the resin component constituting the cover. If the amount of the white pigment is 0.5 part by mass or more, it is possible to impart the opacity to the resultant cover. In addition, if the amount of the white pigment is more than 10 parts by mass, the durability of the resultant cover may deteriorate.

The slab hardness of the cover composition is preferably set in accordance with the desired performance of the golf ball. For example, in case of a so-called distance golf ball which focuses on a flight distance, the cover composition preferably has a slab hardness of 50 or more, more preferably 55 or more in shore D hardness, and preferably has a slab hardness of 80 or less, more preferably 70 or less in shore D hardness. If the cover composition has a slab hardness of 50 or more, the obtained golf ball has a higher launch angle and a lower spin rate on driver shots and iron shots, and thus travels a greater distance. In addition, if the cover composition has a slab hardness of 80 or less, the obtained golf ball has better durability. Further, in case of a so-called spin golf ball which focuses on controllability, the cover composition preferably has a slab hardness of less than 50 in Shore D hardness, and preferably has a slab hardness of 20 or more, more preferably 25 or more in shore D hardness. If the cover composition has a slab hardness of less than 50 in Shore D hardness, the flight distance on driver shots can be improved by the core of the present invention, as well as the obtained golf ball readily stops on the green due to the high spin rate on approach shots. In addition, if the cover composition has a slab hardness of 20 or more in Shore D hardness, the abrasion resistance is enhanced. In case of a plurality of cover layers, the slab hardness of the cover composition constituting each layer may be identical or different as long as the slab hardness of the cover composition constituting each layer falls within the above range.

Examples of the method of molding the cover of the golf ball according to the present invention include a method which comprises molding the cover composition into a hollow shell, covering the core with a plurality of the hollow shells and performing compression molding (preferably a method which comprises molding the cover composition into a hollow half-shell, covering the core with two of the half-shells and performing compression molding); and a method which comprises injection molding the cover composition directly onto the core.

Concave portions called "dimples" are usually formed on the surface of the cover when the cover is molded. The total number of dimples is preferably 200 or more and 500 or less. If the total number of dimples is less than 200, the dimple effect is hardly obtained. On the other hand, if the total number of dimples exceeds 500, the dimple effect is hardly obtained because the size of the respective dimple is small. The shape (shape in a plan view) of the dimples formed on the cover includes, without limitation, a circle; a polygonal shape such as a roughly triangular shape, a roughly quadrangular shape, a roughly pentagonal shape and a roughly hexagonal shape; and other irregular shape. These shapes may be employed solely, or at least two of them may be employed in combination.

The thickness of the cover is preferably 4.0 mm or less, more preferably 3.0 mm or less, and even more preferably 2.0 mm or less. If the cover has a thickness of 4.0 mm or less, the resultant golf ball has better resilience or shot feeling. The thickness of the cover is preferably 0.3 mm or more, more preferably 0.5 mm or more, even more preferably 0.8 mm or more, and most preferably 1.0 mm or more. If the cover has a thickness of less than 0.3 mm, the durability or wear resistance of the cover may be lowered. In the case that the golf ball comprises a plurality of cover layers, the total thickness of a plurality of cover layers preferably falls within the above range. The golf ball body having the cover formed thereon is ejected from the mold, and is preferably subjected to surface treatments such as deburring, cleaning and sandblast where necessary. In addition, if desired, a paint film or a mark may be formed.

The golf ball according to the present invention preferably has a diameter ranging from 40 mm to 45 mm. In light of satisfying the regulation of US Golf Association (USGA), the diameter is most preferably 42.67 mm or more. In light of prevention of air resistance, the diameter is more preferably 44 mm or less, and most preferably 42.80 mm or less. In addition, the golf ball preferably has a mass of 40 g or more and 50 g or less. In light of obtaining greater inertia, the mass is more preferably 44 g or more, and most preferably 45.00 g or more. In light of satisfying the regulation of USGA, the mass is most preferably 45.93 g or less.

When the golf ball according to the present invention has a diameter in a range of from 40 mm to 45 mm, the compression deformation amount (shrinking amount along the compression direction) of the golf ball when applying a load from an initial load of 98 N to a final load of 1275 N to the golf ball is preferably 2.0 mm or more, more preferably 2.4 mm or more, even more preferably 2.5 mm or more, and most preferably 2.8 mm or more, and is preferably 4.0 mm or less, more preferably 3.8 mm or less, and even more preferably 3.6 mm or less. If the compression deformation amount is 2.0 mm or more, the golf ball does not become excessively hard, and thus the shot feeling is better. On the other hand, if the compression deformation amount is 4.0 mm or less, the resilience is better.

The construction of the golf ball according to the present invention is not particularly limited, as long as the golf ball comprises a spherical core and at least one cover layer covering the spherical core. The spherical core is preferably single layered. Unlike a multiple layered core, the single layered spherical core does not have an energy loss at the interface of the multiple layered core when being hit, and thus has better resilience. In addition, the cover has a construction composed of at least one layer, and may have either a single layered construction or a multiple layered construction composed of at least two layers. Examples of the golf ball according to the present invention include a two-piece golf ball composed of a spherical core and a single layered cover disposed around the spherical core; a multi-piece golf ball (including a three-piece golf ball) composed of a spherical core and at least two cover layers disposed around the spherical core; and a wound golf ball composed of a spherical core, a rubber thread layer formed around the spherical core and a cover disposed around the rubber thread layer. The present invention can be suitably applied to any one of the above golf balls.

The FIGURE is a partially cutaway cross-sectional view of a golf ball 1 according to one embodiment of the present invention. The golf ball 1 comprises a spherical core 2, and a cover 3 covering the spherical core 2. A plurality of dimples 31 are formed on the surface of the cover. Other portions than the dimples 31 on the surface of the golf ball 1 are lands 32. The golf ball 1 is provided with a paint layer and a mark layer on an outer side of the cover 3, but these layers are not depicted.

EXAMPLES

Next, the present invention will be described in detail by way of examples. However, the present invention is not limited to the examples described below. Various changes and modifications without departing from the spirit of the present invention are included in the scope of the present invention.

[Evaluation Method]
(1) Compression Deformation Amount (mm)

The deformation amount along the compression direction of the core (shrinking amount along the compression direction of the core), when applying a load from an initial load of 98 N to a final load of 1275 N to the core, was measured.

(2) Core Hardness Distribution (Shore C Hardness)

A type P1 auto loading durometer available from Kobunshi Keiki Co., Ltd. provided with a Shore C type spring hardness tester was used to measure the hardness of the core. The Shore C hardness measured at the surface of the core was adopted as the surface hardness of the core. In addition, the core was cut into two hemispheres to obtain a cut plane, and the hardness at the central point of the cut plane and the hardness at predetermined distances from the central point of the cut plane were measured. It is noted that the hardness of the core was measured at four points at the predetermined distance from the central point of the cut plane, and the average value thereof was adopted as the hardness of the core at the predetermined distance. The hardness was measured with an automatic hardness tester (Digitest II, available from Bareiss company) using a testing device of "Shore C".

(3) Spin Rate on Driver Shots (rpm)

A W #1 driver provided with a metal head (SRIXON Z745, loft angle: 8.5°, available from Sumitomo Rubber Industries, Ltd.) was installed on a swing robot M/C available from Golf Laboratories, Inc. The golf ball was hit at a head speed of 50 m/sec, and the spin rate of the golf ball right after the hitting was measured. The measurement was conducted twelve times for each golf ball, and the average value thereof was adopted as the measurement value for that golf ball. It is noted that the spin rate of the golf ball immediately after the hitting was measured by continuously taking a sequence of photographs of the hit golf ball. The spin rate of each golf ball is shown as a difference from the spin rate of the golf ball No. 6.

[Preparation of Compound Represented by Formula (1) (Fatty Acid Metal Salt)]
(1) Fatty Acid Metal Salt No. 1

81 g (1.0 mol) of zinc oxide and 400 mL of toluene were charged into a 2 L separable flask. The liquid was stirred to obtain a suspension, and 75 g (1.0 mol) of acrylic acid and 89 g (1.0 mol) of crotonic acid were added dropwise and mixed in the suspension. After the dropwise addition, the resultant mixture was allowed to react at 75° C. for 8 hours. After the reaction, the solvent was removed to obtain the fatty acid metal salt No. 1.

(2) Fatty Acid Metal Salt No. 2

8 g (0.1 mol) of zinc oxide and 40 mL of toluene were charged into a 200 mL separable flask. The liquid was stirred to obtain a suspension, and 7.5 g (0.1 mol) of acrylic acid and 10 g (0.1 mol) of 2,4-pentadienoic acid were added dropwise and mixed in the suspension. After the dropwise addition, the resultant mixture was allowed to react at 75° C. for 4 hours. After the reaction, the solvent was removed to obtain the fatty acid metal salt No. 2.

[Production of Golf Ball]

(1) Production of Core

According to the formulations shown in Table 1, the rubber compositions were kneaded with a kneading roll, and heat-pressed in upper and lower molds, each having a hemispherical cavity, for 20 minutes to 40 minutes to produce spherical cores having a diameter of 39.8 mm. The pressing temperatures were shown in Table 1.

DCP: dicumyl peroxide "Percumyl (registered trademark) D" (one-minute half-life temperature: 175.2° C.) available from NOF Corporation WHITE SEAL: zinc oxide available from INDOLYSAGHT Co. Ltd.

Zinc stearate: available from Wako Pure Chemical Corporation (purity is at least 99%)

(2) Production of Cover and Production of Golf Ball

The cover material having the formulation shown in Table 2 was extruded with a twin-screw kneading type extruder to prepare the cover composition in a pellet form. The conditions for extruding the cover composition were a screw diameter of 45 mm, a screw rotational speed of 200 rpm, and screw L/D=35, and the mixture was heated to 160 to 230° C. at the die position of the extruder. The obtained cover composition was injection molded onto the spherical core obtained above such that the formed cover had a thickness of 1.5 mm, to produce golf balls having the spherical core and the cover covering the core. Evaluation results of the obtained golf balls are shown in Table 1.

TABLE 1

| | | Golf ball No. | | | | | | | |
|---|---|---|---|---|---|---|---|---|---|
| | | 1 | 2 | 3 | 4 | 5 | 6 | 7 | 8 |
| Core Rubber composition | BR730 | 100 | 100 | 100 | 100 | 100 | 100 | 100 | 100 |
| | WHITE SEAL | 5 | 5 | 5 | 5 | 5 | 5 | 5 | 5 |
| | ZN-DA90S | 17.6 | 11.8 | 17.6 | 27 | 27 | 30 | 25 | 22.1 |
| | Fatty acid metal salt No. 1 | 11.3 | 22.6 | — | 6 | 18 | — | — | 3.5 |
| | Fatty acid metal salt No. 2 | — | — | 9 | — | — | — | — | — |
| | Zinc stearate | 1.1 | 2.3 | 0.9 | 0.6 | 1.8 | — | — | 0.3 |
| | DCP | 0.8 | 0.8 | 0.8 | 0.8 | 0.8 | 0.8 | 0.8 | 0.8 |
| Core pressing temperature (° C.) | | 140 | 140 | 140 | 170 | 170 | 170 | 140 | 140 |
| Core hardness distribution (Shore C) | Core compression deformation amount (mm) | 3.43 | 3.32 | 3.67 | 3.42 | 3.85 | 3.16 | 3.47 | 3.18 |
| | Core center hardness Ho | 51.4 | 45.4 | 54.1 | 54.7 | 44.7 | 60.9 | 62.7 | 60.3 |
| | Hardness at 12.5% point of core radius | 53.2 | 48.5 | 55.6 | 64.1 | 53.9 | 69.2 | 63.2 | 62.9 |
| | Hardness at 25% point of core radius | 55.2 | 51.7 | 58.3 | 69.5 | 62.5 | 72.8 | 65.0 | 65.8 |
| | Hardness H37.5 at 37.5% point of core radius | 58.6 | 55.1 | 61.7 | 70.8 | 65.9 | 73.5 | 67.0 | 69.6 |
| | Hardness at 50% point of core radius | 68.6 | 63.3 | 66.8 | 71.3 | 67.7 | 73.9 | 70.1 | 73.7 |
| | Hardness at 62.5% point of core radius | 74.3 | 72.2 | 70.7 | 70.6 | 66.9 | 73.5 | 72.7 | 77.0 |
| | Hardness at 75% point of core radius | 77.1 | 77.9 | 74.5 | 73.2 | 71.6 | 75.7 | 74.2 | 79.0 |
| | Core surface hardness Hs | 77.8 | 78.4 | 78.4 | 85.4 | 87.2 | 89.3 | 78.1 | 77.5 |
| | H37.5—Ho | 7.2 | 9.8 | 7.6 | 16.2 | 21.2 | 12.7 | 4.3 | 9.3 |
| | Hs—Ho | 26.5 | 33.1 | 24.3 | 30.8 | 42.6 | 28.5 | 15.4 | 17.2 |
| | (H37.5—Ho)/(Hs—Ho) | 0.27 | 0.30 | 0.31 | 0.53 | 0.50 | 0.45 | 0.28 | 0.54 |
| Golf ball performance | Spin rate on driver shots (rpm) | −100 | −120 | −70 | −30 | −50 | 0 | 0 | −10 |

The materials used in Table 1 are shown as follows.

BR730: high-cis polybutadiene rubber (cis-1,4 bond amount=96 mass %, 1,2-vinyl bond amount=1.3 mass %, Moony viscosity ($ML_{1+4}$ (100° C.))=55, molecular weight distribution (Mw/Mn)=3) available from JSR Corporation ZN-DA90S: zinc acrylate (including 10 mass % of zinc stearate) available from Nisshoku Techno Fine Chemical Co., Ltd.

TABLE 2

| Cover composition No. | 1 |
|---|---|
| Himilan 1555 | 40 |
| Himilan 1605 | 20 |
| Himilan AM7329 | 40 |
| Titanium dioxide (A220) | 3 |

TABLE 2-continued

| Cover composition No. | 1 |
|---|---|
| JF-90 | 0.2 |
| Hardness (Shore D) | 63 |

Formulation: parts by mass

The materials used in Table 2 are shown as follows.

Himilan 1555: Na neutralized ionomer available from Dow-Mitsui Polychemicals Co., Ltd.

Himilan 1605: Na neutralized ionomer available from Dow-Mitsui Polychemicals Co., Ltd.

Himilan AM7329: Zn neutralized ionomer available from Dow-Mitsui Polychemicals Co., Ltd.

Titanium dioxide: A-220 available from Ishihara Sangyo Kaisha, Ltd.

JF-90: light stabilizer available from Johoku Chemical Co., Ltd.

It can be seen from the results shown in Table 1 that the golf ball according to the present invention has a decreased spin rate on driver shots.

This application is based on Japanese Patent application No. 2019-174424 filed on Sep. 25, 2019, the contents of which are hereby incorporated by reference.

The invention claimed is:

1. A golf ball comprising a spherical core and at least one cover layer covering the spherical core, wherein the spherical core is formed from a rubber composition containing:
   (a) a base rubber,
   (b-1) a first co-crosslinking agent consisting of one member selected the group consisting of acrylic acid, methacrylic acid, an acrylic acid metal salt consisting of an acrylic acid group and a metal ion, and a methacrylic acid metal salt consisting of a methacrylic acid group and a metal ion,
   (b-2) a second co-crosslinking agent consisting of a compound of formula (1) below, and
   (c) a crosslinking initiator,
   wherein formula (1) of (b-2) the second co-crosslinking agent is:

$(R^1COO)M(OCOR^2)m$     (1)

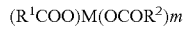

wherein in the formula (1),
   M represents a metal atom,
   m represents 1 or 2, and
   $R^1$ and $R^2$ are different from each other, represent an alkenyl group having 2 to 30 carbon atoms or an alkynyl group having 2 to 30 carbon atoms and have a carbon-carbon double bond or a carbon-carbon triple bond at an α-position carbon atom bonding to a carbonyl group, and when m is 2, two of $R^2$ may be identical to or different from each other with the proviso that if $R^1$ is an ethenyl group (vinyl group) then $R^2$ cannot be an isopropenyl group, and if $R^1$ is an isopropenyl group then $R^2$ cannot be an ethenyl group (vinyl group), and wherein the rubber composition contains (b-2) the second co-crosslinking agent in an amount ranging from 3 parts by mass to 40 parts by mass, and (b-1) and (b-2) the first and second co-crosslinking agents in a total amount ranging from 10 parts by mass to 50 parts by mass, all with respect to 100 parts by mass of (a) the base rubber.

2. The golf ball according to claim 1, wherein $R^1$ and $R^2$ each have 2 to 6 carbon atoms in the compound represented by the formula (1).

3. The golf ball according to claim 1, wherein $R^1$ has 2 to 3 carbon atoms in the compound represented by the formula (1).

4. The golf ball according to claim 1, wherein $R^2$ has 3 to 6 carbon atoms in the compound represented by the formula (1).

5. The golf ball according to claim 1, wherein the metal atom (M) is at least one metal atom selected from the group consisting of zinc, calcium, magnesium and aluminum in the compound represented by the formula (1).

6. The golf ball according to claim 5, wherein R" is an ethenyl group (vinyl group) or isopropenyl group, $R^2$ is a 1-propenyl group, 1,3-butadienyl group or 1,3-pentadienyl group, and the metal atom (M) is zinc in the compound represented by the formula (1).

7. The golf ball according to claim 1, wherein the spherical core has a hardness difference (Hs-Ho) of 20 or more in Shore C hardness between a center hardness Ho of the spherical core and a surface hardness Hs of the spherical core.

8. The golf ball according to claim 1, wherein a ratio of a hardness difference (H37.5-Ho) between a hardness H37.5 at a point located at a distance of 37.5% of a core radius from a center of the spherical core and a center hardness Ho of the spherical core to a hardness difference (Hs-Ho) between the center hardness Ho of the spherical core and a surface hardness Hs of the spherical core, is 0.4 or less.

9. The golf ball according to claim 1, wherein the spherical core has a center hardness Ho in a range of from 30 to 70 in Shore C hardness.

10. The golf ball according to claim 1, wherein the spherical core has a surface hardness Hs in a range of from 65 to 100 in Shore C hardness.

11. The golf ball according to claim 1, wherein the spherical core has a hardness H37.5 in a range of from 40 to 75 in Shore C hardness at a point located at a distance of 37.5% of a core radius from a center of the spherical core.

12. The golf ball according to claim 1, wherein the rubber composition contains (b-2) the second co-crosslinking agent in an amount ranging from 3.5 parts by mass to 30 parts by mass with respect to 100 parts by mass of (a) the base rubber.

13. The golf ball according to claim 1, wherein a ratio of a hardness difference (H37.5— Ho) between a hardness H37.5 at a point located at a distance of 37.5% of a core radius from a center of the spherical core and a center hardness Ho of the spherical core to a hardness difference (Hs-Ho) between the center hardness Ho of the spherical core and a surface hardness Hs of the spherical core, ranges from 0.27 to 0.40.

14. The golf ball according to claim 1, wherein a ratio of a hardness difference (H37.5-Ho) between a hardness H37.5 at a point located at a distance of 37.5% of a core radius from a center of the spherical core and a center hardness Ho of the spherical core to a hardness difference (Hs-Ho) between the center hardness Ho of the spherical core and a surface hardness Hs of the spherical core, ranges from 0.27 to 0.54.

15. The golf ball according to claim 1, wherein $R^1$ is an ethenyl group (vinyl group) or isopropenyl group, and $R^2$ is a 1,3-butadienyl group.

16. A golf ball comprising a spherical core and at least one cover layer covering the spherical core, wherein the spherical core is formed from a rubber composition containing;
   (a) a base rubber, (b-1) a first co-crosslinking agent consisting of one member selected from the group consisting of acrylic acid, methacrylic acid, an acrylic acid metal salt consisting of an acrylic acid group and a metal ion, and a methacrylic acid metal salt consisting of a methacrylic acid group and a metal ion, (b-2) a second co-crosslinking agent consisting of a compound of formula (1) below, and (c) a crosslinking initiator, wherein formula (1) of (b-2) the second co-crosslinking agent is:

$$(R^1COO)M(OCOR^2)_m \quad (1)$$

wherein in the formula (1),

M represents at least one metal atom selected from the group consisting of zinc, calcium, magnesium and aluminum, m represents 1 or 2, and $R^1$ and $R^2$ are different from each other, $R^1$ represents an alkenyl group having 2 to 3 carbon atoms, $R^2$ represents an alkenyl group having 3 to 6 carbon atoms, $R^1$ and $R^2$ have a carbon-carbon double bond at an α-position carbon atom bonding to a carbonyl group, and when m is 2, two of $R^2$ may be identical to or different from each other with the proviso that if $R^1$ is an ethenyl group (vinyl group) then $R^2$ cannot be an isopropenyl group, and if $R^1$ is an isopropenyl group then $R^2$ cannot be an ethenyl group (vinyl group), and wherein the rubber composition contains (b-2) the second co-crosslinking agent in an amount ranging from 3 parts by mass to 40 parts by mass, and (b-1) and (b-2) the first and second co-crosslinking agents in a total amount ranging from 10 parts by mass to 50 parts by mass, all with respect to 100 parts by mass of (a) the base rubber.

17. The golf ball according to claim 16, wherein $R^1$ is an ethenyl group (vinyl group) or isopropenyl group, $R^2$ is a 1-propenyl group, 1,3-butadienyl group or 1,3-pentadienyl group, and the metal atom (M) is zinc in the compound represented by the formula (1).

18. The golf ball according to claim 17, wherein a ratio of a hardness difference (H37.5-Ho) between a hardness H37.5 at a point located at a distance of 37.5% of a core radius from a center of the spherical core and a center hardness Ho of the spherical core to a hardness difference (Hs-Ho) between the center hardness Ho of the spherical core and a surface hardness Hs of the spherical core, is 0.4 or less.

19. The golf ball according to claim 16, wherein a ratio of a hardness difference (H37.5-Ho) between a hardness H37.5 at a point located at a distance of 37.5% of a core radius from a center of the spherical core and a center hardness Ho of the spherical core to a hardness difference (Hs-Ho) between the center hardness Ho of the spherical core and a surface hardness Hs of the spherical core, ranges from 0.27 to 0.40.

20. The golf ball according to claim 16, wherein a ratio of a hardness difference (H37.5-Ho) between a hardness H37.5 at a point located at a distance of 37.5% of a core radius from a center of the spherical core and a center hardness Ho of the spherical core to a hardness difference (Hs-Ho) between the center hardness Ho of the spherical core and a surface hardness Hs of the spherical core, ranges from 0.27 to 0.54.

* * * * *